(12) United States Patent
Kasman

(10) Patent No.: US 7,900,198 B2
(45) Date of Patent: Mar. 1, 2011

(54) METHOD AND SYSTEM FOR PARAMETER PROFILE COMPILING

(75) Inventor: Bulent Kasman, Antioch, CA (US)

(73) Assignee: Wind River Systems, Inc., Alameda, CA (US)

( * ) Notice: Subject to any disclaimer, the term of this patent is extended or adjusted under 35 U.S.C. 154(b) by 1185 days.

(21) Appl. No.: 11/541,904

(22) Filed: Oct. 2, 2006

(65) Prior Publication Data

US 2008/0082967 A1    Apr. 3, 2008

(51) Int. Cl.
*G06F 9/45* (2006.01)

(52) U.S. Cl. ............ 717/158; 717/124; 717/127; 717/130; 717/131; 717/154

(58) Field of Classification Search ........... 717/124, 717/158
See application file for complete search history.

(56) References Cited

U.S. PATENT DOCUMENTS

| | | | |
|---|---|---|---|
| 5,450,586 A * | 9/1995 | Kuzara et al. | 717/124 |
| 6,721,941 B1 * | 4/2004 | Morshed et al. | 717/127 |
| 6,760,903 B1 * | 7/2004 | Morshed et al. | 717/130 |
| 7,171,670 B2 * | 1/2007 | Motoyama et al. | 719/310 |
| 7,493,607 B2 * | 2/2009 | Moritz | 717/151 |
| 7,703,106 B2 * | 4/2010 | Eschenroeder et al. | 719/320 |
| 2003/0014515 A1 * | 1/2003 | Motoyama et al. | 709/224 |
| 2004/0163079 A1 * | 8/2004 | Noy et al. | 717/154 |
| 2004/0210877 A1 * | 10/2004 | Sluiman et al. | 717/130 |
| 2005/0034105 A1 * | 2/2005 | Hind et al. | 717/130 |
| 2006/0218639 A1 * | 9/2006 | Newman et al. | 726/25 |

* cited by examiner

*Primary Examiner*—Thomas K Pham
(74) *Attorney, Agent, or Firm*—Fay Kaplun & Marcin, LLP

(57) ABSTRACT

A method for extracting context information from an extraction module to create a minimized extraction module, creating a parameter profile from the context information, transmitting the minimized extraction module to a target device, receiving a value extracted from the target device by the minimized extraction module, and combining the value with at least a portion of the context information to create a user readable log statement. A system having an extraction element extracting context information from an extraction module to create a minimized extraction module, a creating element creating a parameter profile from the context information, a transmitting element transmitting the minimized extraction module to a target device, a receiving element receiving a value extracted from the target device by the minimized extraction module, and a combining element combining the value with at least a portion of the context information to create a user readable log statement.

18 Claims, 3 Drawing Sheets

METHOD AND SYSTEM FOR PARAMETER PROFILE COMPILING

INCORPORATION BY REFERENCE

The following application hereby incorporates by reference each of the following applications filed on an even date herewith, including the application titled "Method and System for Editing Code" by inventors Bulent Kasman and Edmund dela Cruz in its entirety, the application titled "Method and System for Dynamic Patching of Software" by inventor Bulent Kasman in its entirety, and the application titled "Method and System for Dynamic Debugging of Software" by inventor Bulent Kasman in its entirety.

BACKGROUND

The ability to build, debug, and deploy software programs onto a target device is critical to software development. Debugging often involves monitoring variables, parameters, and/or resources used in a software program. One conventional method of monitoring involves inserting print statements within the program's code and performing a diagnostics session. Monitoring may also be performed during specific times of the program's execution. For example, breakpoints are often used to pause or terminate program execution, allowing the developer perform a diagnostics session in order to view the status of the variables, parameters, and resources at the specified times. However, the conventional debugging methods described above are limited. Since changes to the program code are required during debugging, the program must be recompiled and re-executed in order to view the results of these changes. Thus, the conventional debugging methods cannot be applied to programs that are currently being executed without interrupting the operation of the programs.

Additional diagnostics interactions with the program code on the target device may also be required, such as downloading patches, extracting data related to program performance and servicing, and/or collecting parameter data relating to a business operating the program. The performance of these interactions may require diagnostics data storage on the target device, thereby limiting the resource of the target device and increasing the overhead required to effectively operate the program code once deployed onto the target device.

SUMMARY OF THE INVENTION

The present invention relates to a method and system for compiling a parameter profile. According to an embodiment of the present invention, the method comprises extracting context information from an extraction module, where the extracting creates a minimized extraction module, creating a parameter profile from the context information, transmitting the minimized extraction module to a target device, receiving a value extracted from the target device, the value being extracted by the minimized extraction module, and combining the value with at least a portion of the context information in the parameter profile to create a user readable log statement. According to another embodiment of the present invention, the system comprises an extraction element extracting context information from an extraction module, where the extracting creates a minimized extraction module, a creating element creating a parameter profile from the context information, a transmitting element transmitting the minimized extraction module to a target device, a receiving element receiving a value extracted from the target device, the value being extracted by the minimized extraction module, and a combining element combining the value with at least a portion of the context information in the parameter profile to create a user readable log statement. In a further alternative embodiment of the present invention, the system comprises an extraction module configured to extract data from running user code loaded onto a target device, a compiling module configured to compile source code of the extraction module into object code that is transmitted to the target device and extract context information from the extraction module, a parameter profile module including the context information extracted from the extraction module, and a log file created from at least a portion of the context information in the parameter profile module and the data extracted from the running user code.

DETAILED DESCRIPTION

Figure 1:
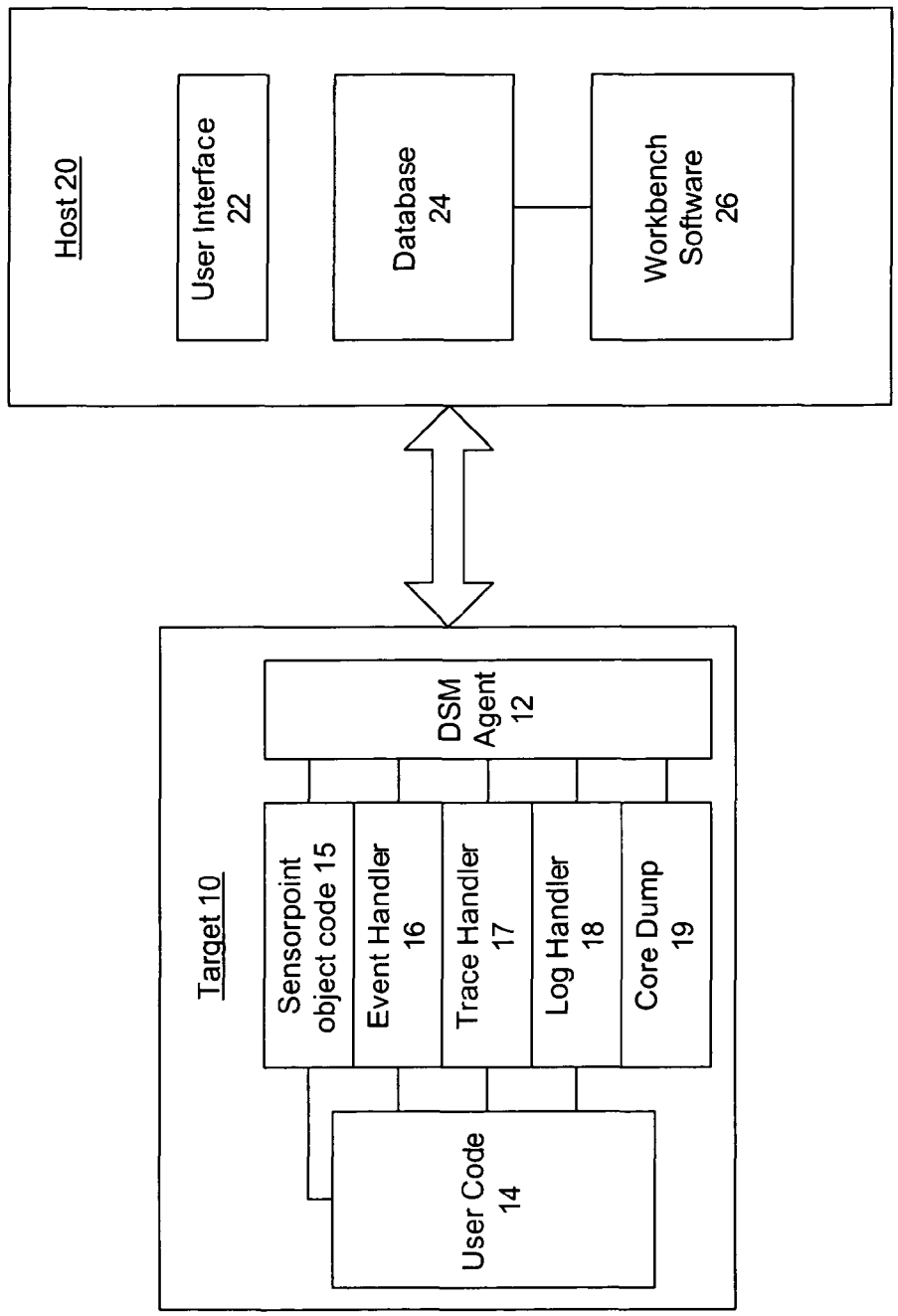
FIG. 1 shows an exemplary system for generating a parameter profile for capturing information to interpret a diagnostic log according to the present invention.

The present invention may be further understood with reference to the following description of exemplary embodiments and the related appended drawings, wherein like elements are provided with the same reference numerals. The present invention is related to systems and methods used to develop, test, and debug software. Specifically, the present invention is related to systems and methods for generating a parameter profile of logging keywords used during a diagnostics session of the software being developed. This parameter profile may be used to interpret log statements, provide context for log statements and correlate log statements to specific locations within the source code. Furthermore, the parameter profile may conserve resources by eliminating overhead on diagnostic tools loaded onto the target device and saving network bandwidth by eliminating the transmission of static or unchanging data to a host device. However, as described in greater detail below, the parameter profile of the present invention is not limited to the development of software, but may also be used to provide context or other information for any type of data that may be extracted from the software and/or the target device.

Software applications are often created on a host computing device and ported to a target device. This type of development is typical for embedded devices. An embedded device is any device that includes a processor or microcontroller that executes software to carry out desired functions. Normally, an embedded device has fewer resources than a general purpose computer, such as having a slower processor, less memory (cache, RAM, Flash, etc.), etc. Examples of embedded devices include mobile phones, personal digital assistants, smart phones, smart process monitoring devices (e.g., thermostats, pressure sensors, flow sensors, etc.), etc. The exemplary embodiments of the present invention will be described with reference to a diagnostic tool for such embedded devices. However, those skilled in the art will understand that the present invention may be implemented in, for example, a diagnostic tool for software executing on any type of device. As will be described in greater detail below, additional independent program code may be installed onto the target device in order to collect useful diagnostic information during the development of the software application. Embodiments of the present invention will be described with reference to the development of software applications for these target devices in both networked and non-networked environments.

FIG. 1 shows an exemplary system 100 for integrating the editing, compiling and installing of program code within an application according to an exemplary embodiment of the present invention. The system 100 includes a target device 10 and a host device 20. In one embodiment, both the target 10 and the host 20 may be located in a lab environment, while in another embodiment, the target 10 and/or the host 20 may be in a field environment. For example, the target 10 may be deployed in a warehouse, office, etc., while the host resides in a laboratory or central server location. The target 10 and the host 20 may include conventional computing components such as a processor (e.g., a microprocessor, an embedded controller, etc.) and a memory (e.g., Random Access Memory, Read-only Memory, a hard disk, etc.). Communication between the target 10 and the host 20 occurs over a communication link, which may be a wired (e.g., Ethernet, serial port, Universal Serial Bus, etc.) or wireless (e.g., Bluetooth, IEEE 802.1x, etc.) connection.

The host 20 may include a user interface 22, a database 24 and workbench software 26. The user interface 22 enables a user (e.g., a software developer) to interact with the host 20 by receiving instructions and data requests. The user interface 22 may comprise any number of standard input and/or output devices, such as a keyboard, a mouse, a display, etc. Through the user interface 22, the developer may instruct the host 20 to transmit data to and/or from the target 10. The data may include sensorpoint modules and monitoring data. As will be discussed in detail below, sensorpoint modules comprise program code that the developer can implement on the target 10. Monitoring data may include any relevant data that the developer wishes to receive from the target 10, such as device information, alarms and error messages, log information, and audit information (e.g., information related to users modifying devices and/or sensorpoint modules). The monitoring data may also relate to device type. For example, if the target 10 is a cell phone, the monitoring data may include call usage information, signal strength information, etc. The monitoring data may be transmitted automatically (e.g., a predetermined intervals) or upon request by the developer. For example, the user may request to view a log file generated by the target 10 in order to view specific program output.

The workbench software 26 is a software development tool used by the developer to create, modify, and debug software programs. The workbench software 26 may comprise a software suite that includes any number of individual software development programs, such as a compiler, a debugger, a source code analyzer, a text editor, etc. These individual programs may either be run independently of a running application or within a main development program. Using the workbench software 26, the user can create a sensorpoint module, write and edit code for the sensorpoint module, compile the code, abstract a parameter profile from the compiled code, and save the sensorpoint module to the database 24 or as a local file system. Once the sensorpoint module is saved, it may be selected for transmission to the target 10. Those skilled in the art will understand that the sensorpoint code as written may not be the same as the actual code executed by the target 10. For example, the actual code may be an executable binary file created as a result of compiling and linking the sensorpoint code. The binary may be included in the sensorpoint module as an object file. In addition, the sensorpoint module may include multiple files, such as source, header and library files. These files may be installed individually or together with the entire sensorpoint module.

The database 24, or local file system, stores sensorpoint modules, monitoring data (e.g., diagnostics logging data), and other types of data specified by the developer. The database 24 may also include user information, customer information, information regarding the target 10 (e.g., device type), parameter information regarding a business process, etc. The database 24 may be organized in any number of ways, including separate data structures for holding information corresponding to a specific target, a specific data type (e.g., sensorpoint modules), etc. The database 24 also allows for sensorpoint modules to be grouped together according to the specifications of the developer. For example, the developer may wish to group subcomponents of a larger program together. The database 24 is located on a writable memory, and may be accessed via the user interface 22.

The target 10 may further include a Device Software Management (DSM) agent 12 that may communicate with the host 20, specifically, for example, with the workbench software via the communication link. The DSM agent 12 coordinates the sending and receiving of data. Instructions and data requests are received by the DSM agent 12 and processed accordingly. When data is transmitted or received, the DSM agent 12 may first place the data into a buffer. For example, received sensorpoint modules may be temporarily stored in a buffer before writing to the memory of the target 10. Likewise, data transmitted to the host 20 may first be placed in a buffer and sent when the data is ready for transmission and/or the host 20 is ready to receive the data. The DSM agent 12 may be implemented in hardware, software, or a combination thereof.

The target 10 operates using a user code 14, which comprises a program running in an operating system or a stand-alone program. The user code 14 may be written in any programming language (e.g., C/C++, Java, Assembly language, etc.). The user code 14 may be any program that the developer wishes to run on the target 10. For example, the user code 14 may be a main program or subroutine being developed for implementation on the target 10. The user code 14 may include source, header, library, object, and other data files.

The target 10 may also include sensorpoint object code 15. Similar to the user code 14, the sensorpoint object code 15 may include source, header, library and object files. According to the embodiments of the present invention described herein, a sensor point is defined as a piece of code that is compiled independently of a running application (e.g., the compiled user code 14). The sensorpoint object code 15 may be executed by the running application via branch instructions inserted into the running application (e.g., the executable binary). The sensorpoint object code 15 may include keywords for logging purposes, wherein the keywords may correspond to both sensorpoint directives (e.g., sensorpoint thread) and instrumentation points identifying the locations of the user code 14. The use of the keywords for the generation of parameter profiles will be described in detail below.

The target 10 may also include an event handler 16, a trace handler 17, a log handler 18 and a core dump 19. The event handler 16 responds to events encountered during execution of the user code 14. The events may be user-created (e.g., a mouse click, a menu selection, etc.) or program generated (e.g., a program exception, a software interrupt, etc.). The trace handler 17 stores trace information specified by the user code 14. For example, the trace information may include all read and write instructions, along with corresponding data values and variable names. The trace handler 17 works in conjunction with the log handler 18 to store the trace information into one or more log files, which may then be outputted (e.g., displayed at the target 10 or transmitted to the host 20) for viewing. Using the log handler 18, the developer can specify where log files and what types of information (e.g., reads/writes, error messages, diagnostics data, etc.) should be stored. The core dump 19 handles program crashes by providing a log for specific memory contents, which can be viewed after the program crashes.

Those skilled in the art will understand that the system 100 and the various components described for the host 20 and the target 10 are only exemplary and are being used to illustrate an exemplary embodiment of a parameter profile according to the present invention. However, the parameter profile of the present invention may be implemented on systems that do not include the components described herein, e.g., sensorpoints. Those skilled in the art will understand that the functionality described for the parameter profile may be implemented on other systems that include other components. Specifically, the functionality described for the sensorpoints, e.g., the extraction of data from the user code 14 and/or target 10, may be performed by another component. Such a component may have the same characteristics as a sensorpoint (e.g., compiled code that is executed without interrupting the execution of the user code 14) or it may have different characteristics. Thus, the functionality of concern is the ability to extract data from the user code 14 and/or target 10. Accordingly the term "extraction module" will be used to refer to any component that may perform the extraction of data as described herein.

Figure 2:
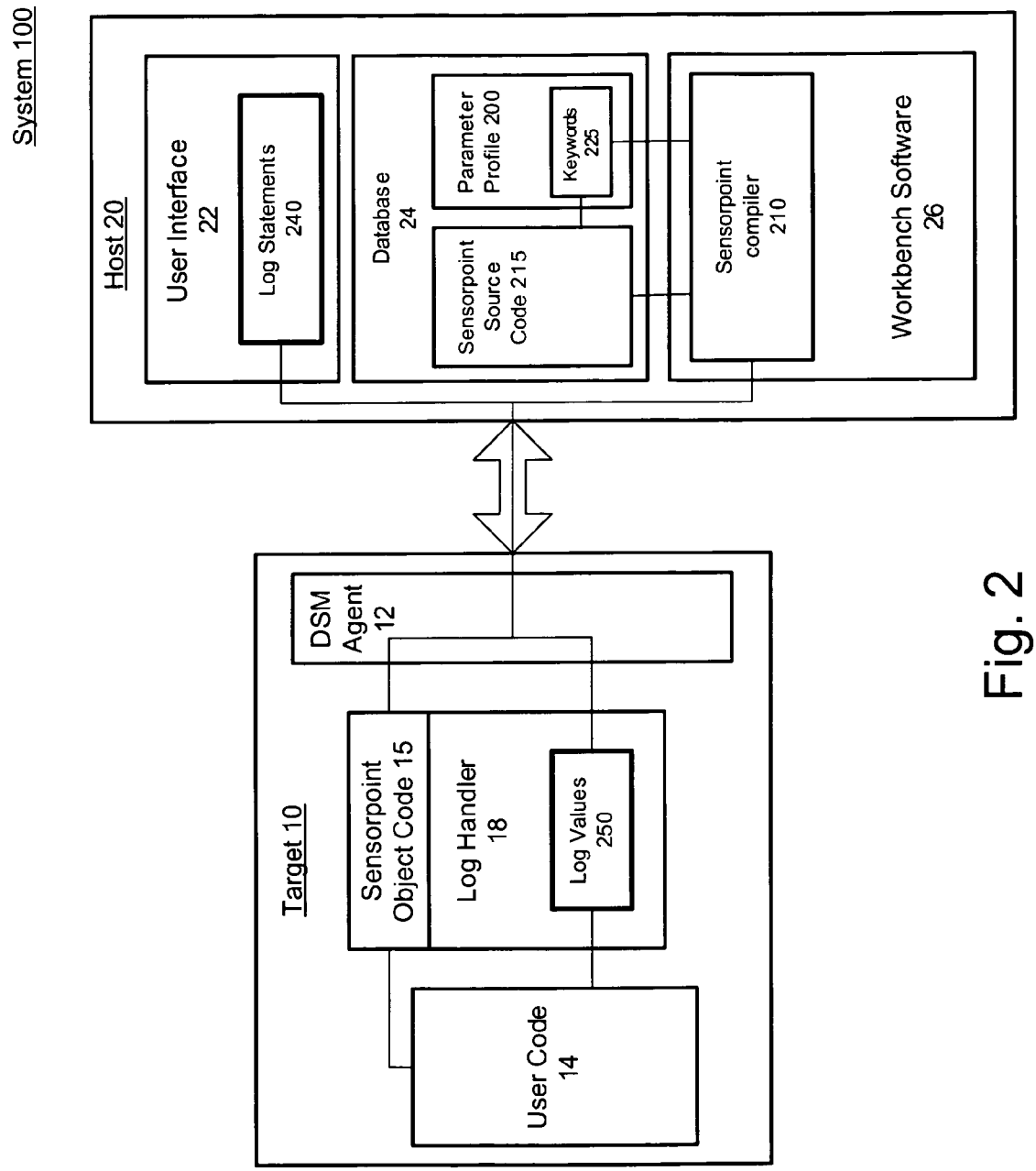
FIG. 2 shows a parameter profile of a compiled sensorpoint code within the exemplary system according to FIG. 1 of the present invention.

FIG. 2 shows a parameter profile 200 of a sensorpoint source code 215 within the exemplary system 100 according to FIG. 1 of the present invention. The parameter profile 200 may include keywords 225 abstracted from the sensorpoint code 15 such as logging information, wherein the logging information may reference the user code 14, a user file name, a line number within a file, location context information, a log identifier, and a log status. Thus, the keywords 225 included within the parameter profile 200 may be used to interpret a diagnostics log generated by the target 10. The use of a parameter profile 200 within the exemplary system 100 may eliminate the need to use the memory of the target 10 to store information required to interpret logs and logs status. The only logging information that is needed from the target 10 is the log identifier(s) from a log data entry generated by, for example, the sensorpoint object code 15 of the target 10. Therefore, the combination of the log identifier generated at the target 10 with the parameter profile 200 may create one or more complete log statements.

An exemplary sensorpoint source code 215 may be written in the C programming language, compiled and linked on the host 20, saved as a sensorpoint object code 15, and transmitted to the target 10 for execution. Branch instructions are inserted into a specific location(s) (i.e., the instrumentation points) of the user code 14 as desired by the developer, and may also be transmitted from the host 20 as part of the sensorpoint module. In other embodiments, the sensorpoint source code 215 may be written and the instrumentation points specified through a user interface located on the target 10 itself. The branch instructions may be inserted by patching the running user code 14 with precompiled branch instructions pointing to the sensorpoint object code 15. When the application reaches the instrumentation point(s), the sensorpoint object code 15 is run before execution of the user code 14 resumes. Thus, the developer may debug, develop and monitor the user code 14 without having to recompile or interrupt the execution of the user program.

As described above, the sensorpoint source code 215 may include multiple files, such as source, header and library files, wherein these files may be compiled and installed individually or together with the sensorpoint source code 215. Included within these files may be an original sensorpoint file (e.g., a ".spc" file) that contains keywords 225 for logging purposes. These keywords 225 may contain the unchanging (or constant) portions of a log statement, such as user source code 14 insertion location and context information. In addition, one or more log statements may be contained within a logging file that is viewable to a user for diagnostic and troubleshooting purposes. For example, the log data entries of a logging file may be data for an error log that records events such as sensorpoint module installation failures, sensorpoint module compilation errors, device execution errors, and other various types of error events. One or more of the sensorpoint modules of the target 10 may be utilized for the generation of the logging information file. As described above, the sensorpoint object code 15 is a software component that includes the compiled sensorpoint source code 215 and instructions relating to how the compiled sensorpoint source code 215 should be implemented.

Those skilled in the art will understand that the log statements are not limited to errors, but may include any information that may be extracted from the user code 14 and/or target 10. for example, the sensorpoint object code 15 may simply include instructions to read the value of a particular register at a certain point in the code. This information may be valuable to the developer for monitoring or diagnostic purposes. Those skilled in the art will understand that the data that may be extracted using sensorpoints (or similar construct) from the target 10 while user code 14 is executing is only limited by the amount of data that is included in the target 10.

In order to generate the parameter profile 200, keywords 225 may be selected during a compilation process. Seeing as the workbench software 26 may be used for writing, editing, compiling, and saving the sensorpoint source code 215, a sensorpoint compiler 210 may be included within the workbench software 26 for compiling sensorpoint source code 215 written for the sensorpoint source module. Once one or more sensorpoint modules are developed, the sensorpoint compiler 210 may be activated to compile all or some of the sensorpoint source code 215. During the compilation process, the sensorpoint compiler 210 may compile the sensorpoint source code 215, thereby creating the sensorpoint module including sensorpoint object code 15 (e.g., a ".usm" file).

In addition, the sensorpoint compiler 210 may extract the keywords 225 from the sensorpoint source code 215 or the sensorpoint object code 15. The sensorpoint compiler 210 may also extracts relevant file information about the application source and binary files as keywords 225. Using the extracted keywords 225, the sensorpoint compiler 210 may generate a parameter profile 200. The parameter profile 200 may be, for example, an additional file in extensible markup language ("XML") that captures the keywords 225 information from the user source code 14. Thus, the parameter profile 200 may be an abstract file that includes some or all of the static information of the sensorpoint source code 205. This parameter profile 200 may then be used to interpret log data entries that are generated by the sensorpoint module of the target 10. Thus, the use of the parameter profile 200 according to embodiments of the present invention may greatly decrease the amount of information needed in the sensorpoint object code 15 that is stored in the memory of the target 10 since some or all of the information needed to interpret log statements and log status remains stored on the host 20 in the parameter profile 200. The target 10 may only need to store a log identifier 250 from the log data entry and communicate the log identifier 250 to the host 20 over the DSM agent 12. As described above, the DSM agent 12 may coordinate the sending and receiving of data between the host 20 and the target 10 via a communication link.

Upon receiving the log identifier 250, the host 10 may combine the log identifier 250 with the parameter profile 200 in order to supply any of the constant, unchanging portions of logging information that are necessary to generate a complete log statement. Furthermore, the combined information from the log identifier 250 and the parameter profile 200 may be displayed to the user via the user interface 22.

In an exemplary application of the present invention, the parameter profile 200 may be helpful during a diagnostics session, which involves analyzing the log identifiers generated by a target 10 as it executes an application. The parameter profile 200 may provide contextual data about each of the log identifiers, thereby allowing for the log identifier and the context data to be displayed to the user at the same time. Therefore, embodiments of the present invention may correlate the data within the log with the user source code 14 and identify the location within the user source code 14. Correlating the information allows for a quicker decision to be made about the behavior of the system 100 based on the context and provides a more efficient software development environment.

For example, the sensorpoint object code 15 may determine one log data entry of "0xef5643" within a large file of log identifiers. However, without the actual log statement that produced the log identifier being instantly available to the user during the diagnostics session, the log data entry becomes meaningless. One possible solution may be to have the target 10 store and list the user source code 14 context information as a part of the log data entry within the file, such as "malloc( ) function returned: 0xef5643." It is clear to see that this solution greatly increases the amount of memory and other resources needed, both within the target 10 as well as by a networked environment, in order to store and transmit the additional context information.

In contrast, according to the exemplary embodiments of the present invention, the context information may be stored in the parameter profile 200 that remains on the host 20. As opposed to having the additional information stored and transmitted to/from the target 10, the sensorpoint object code 15 that extracts the log identifier may be limited to simply the information needed to extract the log identifier without extracting context information. Thus, the sensorpoint object code 15 that is transmitted over the network and stored on the target 10 required less resource. In addition, the log files (including log identifier 250) that are stored on the target 10 and transmitted back to the host 20 also require less resources. As described above, the log identifier may then be combined with the parameter profile 200 to provide any necessary information to interpret the log identifier. By storing the constant, unchanging portions of the log statement with location context information within the parameter profile 200, the present invention may reduce the overhead associated with the logging framework.

Those skilled in the art will understand that while the exemplary embodiment has been described with reference to a logging operation, the present invention is not limited to logging operations. As described above, sensorpoint may be used to extract any type of data from the user code 14 and/or target 10. The parameter profile may be used to provide content information for any of this extracted data. For example, if the target 10 is an embedded automotive component that includes the monitoring of oil pressure, a deployed sensorpoint may extract the oil pressure value from the target 10 (e.g., a value of 150). However, by combining this value with the context information in the parameter profile (e.g., "The current oil pressure is <value>".), the developer or any other interested person (e.g., maintenance technician) may quickly and easily understand the data extracted from the target 10. Thus, this example shows that the parameter profile 200 is not limited to the traditional limited definition of logging related to software debugging and testing, but may be used for a broader expanded logging which includes the extraction of any data from the user code 14 and/or target 10.

Figure 3:
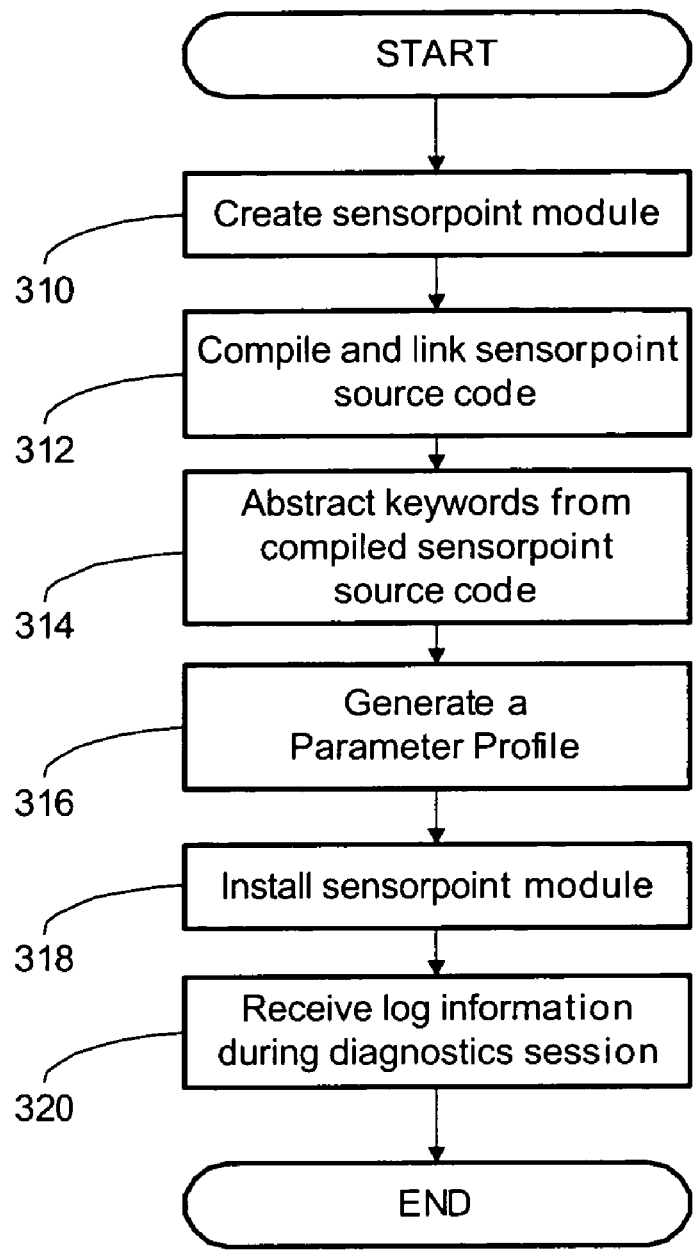
FIG. 3 shows an exemplary method for providing an abstracted profile from a sensorpoint for interpreting a diagnostic log generated by the sensor point according to the present invention.

FIG. 3 shows an exemplary method 300 for software development and parameter profile 200 development according to the present invention. Beginning with step 310, a sensorpoint module is created using the workbench software 26. As previously discussed, the sensorpoint module is a software component that includes the compiled sensorpoint source code 215 and instructions relating to how the compiled sensorpoint source code 215 should be implemented. Furthermore, the sensorpoint source code 215 may contain one or keywords 225 within the code for logging purposes. These keywords 225 may relate to information from the user code 14 that is used to interpret one or more log statements generated by the target 10. The workbench software 26 may be accessed using the user interface 22, or from the target 10 if the target 10 has its own user interface. If the sensorpoint module is a newly created module, the sensorpoint code is written, packaged within the module and stored in the database 24. Alternatively, if the sensorpoint module already exists, the existing sensorpoint code is modified and saved. The developer then specifies the user code 14 location(s) in which the branch instruction(s) should be placed.

In step 312, the sensorpoint source code 215 is compiled using the sensorpoint compiler 210 of the workbench software 26 and saved in the database 24. The compiled sensorpoint source code 215 is then linked. That is, the individual files (source, header, library, etc.) that comprise the compiled sensorpoint source code 215 are combined into a single executable file (i.e., the executable binary). For example, if the programming language is C, the individual files may be placed into a User Sensorpoint Module (USM) file.

In step 314, the sensorpoint compiler 210 abstracts at least one of the keywords 225 from the compiled sensorpoint source code 215. As described above, abstracting the keywords 225 may eliminate the need to use additional memory on the target 10 once the sensorpoint module is installed onto the target 10. Since the information within the keywords 225 relates to the unchanging portions of the logging statements, namely the user code 14 and location context information, the target 10 may avoid storing the information and limit storage primarily to the log identifiers generated by the target 10.

In step 316, the sensorpoint compiler 210 may use the keywords 225 in the generation of the parameter profile 200. Therefore, the parameter profile 200 may provide an abstracted profile from the sensorpoint module that may include all of the contextual information from the user source code 14. Thus, the parameter profile 200 may be composed of detailed information that would be needed to interpret the log statements generated by the target 10. It should be noted that the sensorpoint compiler 210 may generate the parameter profile 200 in the form of an XML file.

In step 318, the compiled sensorpoint source code 215 is installed by transmitting the compiled sensorpoint source code 215 as sensorpoint object code 15 from the host 20 to the target 10. The DSM agent 12 receives the sensorpoint object code 15, saves it into memory allocated to the sensorpoint object code 15, processes the executable binary and updates the user code 14 with the branch instructions. During this time, the target 10 continues to execute the user code 14 and does not encounter any interruption during running of the user source code 14. If the user code 14 encounters the branch instructions during execution, program execution is temporarily suspended in order to allow the sensorpoint program to execute.

In step 320, a diagnostics session may be performed wherein the workbench software 26 of the host 20 receives log information generated by the target 10. The log information may include a plurality of log identifiers which pertaining target-specific information such as data related to the operation of the installed software and physical parameter data related to the business processes. For example, the physical parameter data may be the oil pressure on a motorized vehicle, the battery level on a mobile computing device, etc.

Once the host 20 receives the log information, the log identifiers may be combined with the parameter profile 200 in order to correlate the log identifiers with the user source code 14 and the location in the user source code 14. The user may view the combined information via the user interface 22. By having each log identifier displayed at the same time and place as the user source code 14 context information, the user may efficiently assess both the operation of the software and the parameters of the business processes in order to quickly make decisions regarding the behavior of the system based on the context information. As described above, the log information provides access to log file data that may be viewed by the user for diagnostic and troubleshooting purposes. For example, the log file data may be an error log that records error events such as sensorpoint module installation failures, device execution errors, sensorpoint module compilation errors and other types of error events. Thus, the user may determine whether results of the user program are as expected and, if necessary, makes changes to the sensorpoint object code 15 by repeating steps 310-318.

It is important to note that within the parameter profile 200, each of the log statements may be assigned a name. In addition, within the target 10, a name to an identifier table may be created and transmitted to the host 20. The transmission of the identifier table may be performed once for all of the log statements. The remainder of the log entries from device may be referred to the log id and values. Once the log statement is mapped to a log name in the host 20, the log name may provide information about the log values, such as, for example, the number of parameters logged for each log statement, the parameter data types, the constant data values, etc.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
    extracting, by a compiler, context information from an extraction module, wherein the compiler creates a minimized extraction module, wherein the minimized extraction module is a sensorpoint module;
    creating a parameter profile from the context information;
    transmitting the minimized extraction module to a target device;
    receiving a value extracted from the target device, the value being extracted by the minimized extraction module; and
    combining the value with at least a portion of the context information in the parameter profile to create a user readable log statement.

2. The method of claim 1, further comprising:
    displaying the log statement to a user.

3. The method of claim 1, wherein the context information includes static data included in the extraction module.

4. The method of claim 3, wherein the static data includes one of a location in a user code from where the value was extracted.

5. The method of claim 1, wherein the minimized extraction module is transmitted in object code form.

6. The method of claim 1, wherein the minimized extraction module is inserted as running code into a running user code on the target device and the value is extracted from the running user code.

7. The method of claim 1, wherein the parameter profile includes keywords to relate the value to the context information.

8. A system, comprising:
    a compiler extracting context information from an extraction module, the compiler creating a minimized extraction module, wherein the minimized extraction module is a sensorpoint module;
    a creating element creating a parameter profile from the context information;
    a transmitting element transmitting the minimized extraction module to a target device;
    a receiving element receiving a value extracted from the target device, the value being extracted by the minimized extraction module; and
    a combining element combining the value with at least a portion of the context information in the parameter profile to create a user readable log statement.

9. The system of claim 8, further comprising:
    a display element displaying the log statement to a user.

10. The system of claim 8, wherein the context information includes static data included in the extraction module.

11. The system of claim 10, wherein the static data includes one of a location in a user code from where the value was extracted.

12. The system of claim 8, wherein the minimized extraction module is transmitted in object code form.

13. The system of claim 8, wherein the minimized extraction module is inserted as running code into a running user code on the target device and the value is extracted from the running user code.

14. The system of claim 8, wherein the parameter profile includes keywords to relate the value to the context information.

15. A system, comprising:
    an extraction module configured to extract data from running user code loaded onto a target device;
    a compiling module configured to compile source code of the extraction module into object code that is transmitted to the target device and extract context information from the extraction module;
    a parameter profile module including the context information extracted from the extraction module; and
    a log file created from at least a portion of the context information in the parameter profile module and the data extracted from the running user code.

16. The system of claim 15, wherein the log file is displayed to a user.

17. The system of claim 15, wherein the compiling module extracts the context information from one of the source code of the extraction module and the object code of the extraction module.

18. The system of claim 15, wherein the context information includes keywords.

* * * * *